2,983,763
DECOLORIZING THE PRODUCT OF REACTING AN ALKYLENE OXIDE WITH A HYDROXYL-CONTAINING ORGANIC COMPOUND IN THE PRESENCE OF AN ALKALINE REACTING CATALYST

Walter P. Krause, Austin, Tex., assignor to Jefferson Chemical Company, Inc., Houston, Tex., a corporation of Delaware No Drawing. Filed Apr. 12, 1956, Ser. No. 577,660

13 Claims. (Cl. 260—613)

The present invention relates to a novel process for improving the polyether products resulting from reacting an alkylene oxide with a hydroxyl-containing organic compound in the presence of an alkaline reacting catalyst such as an alkali metal hydroxide. It is the main object of the invention to decolorize such reaction products; but other corollary objects are to render the decolorized products stable as to color, and to reduce their ash content.

Reaction products of the general type benefited by the process of the present invention are prepared in accordance with the following equation:

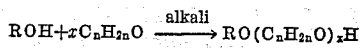

$$ROH + xC_nH_{2n}O \xrightarrow{\text{alkali}} RO(C_nH_{2n}O)_xH$$

wherein:

$x = 1$ or more, usually 4 to 100

$n = 2$ or more, usually 2 to 4

$R$ = alkyl, alkenyl, aryl, alkaryl, aralkyl, alkoxy alkyl or cycloaliphatic; or one of the foregoing groups containing other active or inactive substituents such as hydroxyl or alkyl.

In representative reactions in accordance with the present invention an alkylene oxide such as ethylene oxide is reacted with an hydroxyl-containing organic compound such as ethylene glycol, or an alkylated phenol (e.g. mononoyl phenol), or a compound such as ethylene glycol monomethyl ether, in the presence of an alkaline substance as a catalyst (e.g. sodium or potassium hydroxide, sodium acetate, sodium carbonate, or sodium methylate) to produce a polyether reaction product. Among such polyether reaction products are polyethylene glycol, polypropylene glycol, adducts of alkylated phenol with ethylene oxide, methoxy polyethylene glycol, and adducts of lauryl alcohol with ethylene oxide.

Such polyether reaction products are generally characterized by a light to dark yellow color and by a relatively high ash content, both of which characteristics are undesirable. These undesirable characteristics are improved by treating the polyether reaction product with an acidic compound in an amount sufficient to react with at least part of the alkaline reacting catalyst, and preferably with all of it, to neutralize the catalyst and form a salt. It is especially desirable that the salt so formed should precipitate so that it can be removed easily from the reaction product.

The resulting treated product is decolorized to such an extent as to approach water-white in color, and this decolorized characteristic of the product is stable and frequently even improves over long periods of storage. Furthermore, the treated product, after removal of the precipitated salt, has a greatly reduced ash content compared to the untreated reaction product.

Among the acidic substances which can be used successfully for performing the process of the invention are phosphoric, acetic, sulfuric, and citric acids, and carbon dioxide. Orthophosphoric acid is preferred because it generally forms a precipitate of phosphate crystals which are readily filtered out, thus reducing the ash content of the product.

The amount of acid used advantageously should be between 0.5 to 6 parts by weight to 1 part of the alkaline catalyst, this usually being sufficient to reduce the pH in aqueous solution to a value in the range of 4 to 8.

An important step in the process described above is the admission of air to the reaction product during the acid treatment. Best results are obtained by excluding air from the reaction product until just after treatment with the acidic compound has commenced; but good results as to color removal, color stability and reduced ash content are also obtained to a lesser extent even when air is admitted to the reaction product prior to introduction of the acidic compound.

The mechanism whereby the reaction product is decolorized is not completely understood. There is evidence that peroxides are formed which tend to bleach the product. Adsorption of color bodies on the precipitated salts may also be responsible for some of the color removal. Color bodies may also be oxidized to a colorless form. Whatever the mechanism, the decolorization is most apparent, numerous examples being available when the reduction in color has been from 250 down to 30 on the Pt-Co scale in the case of polyethylene glycols, and from 400 down to 60 in the case of adducts of mononoyl phenol with ethylene oxide.

The Pt-Co scale is a measure of color as determined from the standard Hazen platinum-cobalt solution prepared as described in "Standard Methods of Chemical Analyses" fifth edition, vol. 2, page 2048—by Scott.

Ash content is a measure of the amount of inorganic solids dissolved in the product. When the ash-forming solids remaining in the product amount in weight to appreciably less than the alkaline material introduced originally as catalyst, it can be said that the ash content has been reduced. The amount of catalyst in the untreated product is referred to as estimated ash.

The principles of the invention will be explained more in detail below as applied to the manufacture of specific decolorized polyether reaction products.

POLYALKYLENE GLYCOLS

Polyethylene glycols of molecular weight 150–1000, and greater have been prepared successfully by the batchwise reaction of ethylene oxide with ethylene or diethylene glycol in the presence of sodium hydroxide catalyst. Normal reaction conditions included temperatures in the range of 140 to 160° C., and pressures of 25 to 60 p.s.i.g. (pounds per square inch gauge). The average molecular weight of the product is determined by the weight ratio of ethylene oxide to ethylene or diethylene glycol, and the product in each case is a mixture of varying chain lengths.

After completion of the initial reaction the alkaline polyethylene glycol reaction product is treated with an acidic compound and digested at 100° to 150° C. in the presence of air for a period of time determined by the color and pH of the product. The digestion procedure results in a considerable decolorization of the product, accompanied by a decrease in pH. When both pH and color are found acceptable the product is filtered at 100° to 150° C. to remove precipitated salts.

Example I

To a charge of 665 pounds of diethylene glycol in a reactor were added 150 grams of sodium hydroxide catalyst dissolved in 300 grams of water. Ethylene oxide in the amount of 1860 pounds was reacted with the diethylene glycol over a period of 5.2 hours while holding the temperature at 150–160° C. and the reactor pressure at 35–40 p.s.i.g. The polyethylene glycol product was pale yellow in color, the Pt-Co color being 150, and had an estimated ash content of 0.013 wt. percent.

After completion of the above reaction, 225 grams of 85% orthophosphoric acid was added to the polyethylene glycol product in the reactor while excluding air therefrom, providing a weight ratio of 1.5 parts of acid to 1 part of sodium hydroxide. Air was then admitted to the reactor and the product digested for 1 hour at 120–140° C.

Then the product was filtered to remove precipitated phosphate salts, after which the product was found to be almost water-white in color, with a Pt-Co color of only 17, and an ash content of only 0.0045 wt. percent. The molecular weight of the polyethylene glycol product was approximately 400.

*Example II*

The same reactions were carried out successfully under different conditions, as outlined below. The product obtained was polyethylene glycol of molecular weight 300.

Initial reaction:

| | |
|---|---|
| Diethylene glycol _____lbs__ | 860 |
| Ethylene oxide _____lbs__ | 1653 |
| Sodium hydroxide _____grams__ | 195 |
| Water _____do____ | 390 |
| Reaction temperature _____° C__ | 153–155 |
| Pressure _____p.s.i.g__ | 21–29 |
| Holding time _____hours__ | 4.5 |
| Product color (Pt-Co) _____ | 120 |
| Estimated ash content, wt. percent _____ | 0.017 |

Product treatment:

| | |
|---|---|
| Orthophosphoric acid (85%) _____grams__ | 400 |
| Digestion period _____hours__ | 3 |
| Color of filtered product (Pt-Co) _____ | 10 |
| Acid:NaOH weight ratio _____ | 2.05 |
| Ash content, wt. percent _____ | 0.010 |

*Example III*

Polyethylene glycol of molecular weight 400 was prepared by the procedure substantially as described in Example I except that potassium hydroxide was employed as catalyst and ethylene glycol was used instead of diethylene glycol. The reaction product had a Pt-Co color of 77.

A portion of the product was treated with 97% sulfuric acid in the amount of 1.5 part of acid to 1.0 part of catalyst by weight. After addition and reaction of the acid, a slow stream of air was passed through the product for 15 minutes while the temperature remained at 120–130° C. The product was then filtered.

The polyethylene glycol so prepared had a Pt-Co color of only 45. After storage under air at 100° C. for 65 hours as an accelerated test of stability a sample of the product had a Pt-Co color of 36.

*Example IV*

Polyethylene glycol of molecular weight 400 was prepared substantially as described in Example I except that sodium acetate was employed as the catalyst and ethylene glycol was used instead of diethylene glycol. The product obtained had a Pt-Co color of 88 and a pH (10% aqueous solution) of 9.8.

The product was acidified by adding citric acid in the amount of 1 part of acid to one part of sodium acetate, the resulting pH being 5.9. After passing a stream of air through the product for 15 minutes, the product obtained had a Pt-Co color of only 11. The product was then filtered. Its ash content was nil. A sample was heated to 100° C. for 65 hours over air and at the completion of the test had a color of 7.

*Example V*

Polyethylene glycol of molecular weight 400 was prepared substantially as described in Example I except that sodium carbonate was employed as the catalyst and ethylene glycol was used instead of diethylene glycol. The product obtained had a Pt-Co color of 94.

The product was treated with 85% phosphoric acid in the amount of 1.5 parts of acid to 1.0 part of sodium carbonate by weight. After blowing the product with air for 15 minuts at 120–130° C., precipitated solid was separated by filtration. The clarified product had a Pt-Co color of 9 and was stable. A sample carried through the accelerated stability test previously described in Example III was found to have a color of only 2.

*Example VI*

Polypropylene glycol of average molecular weight 220 was prepared in the following manner. To 8.0 lbs. of dipropylene glycol, 4.0 g. sodium hydroxide catalyst was added and 5.15 lbs. of propylene oxide was reacted at 140–150° C. and 60 p.s.i.g. pressure. The reaction time was 2.5 hours. Product color was 405 Pt-Co and the pH in 5% aqueous solution was 10.4.

A portion of the product was treated with 85% orthophosphoric acid in the amount 1.5 parts of acid to 1.0 part of catalyst by weight. Air was bubbled through the product for 30 minutes at 110–130° C. The hot filtered product after this treatment had a color of Pt-Co 90 and a pH (5% aqueous) of 6.8. Its ash content was 0.0036 wt. percent.

ADDUCTS OF ALKYLATED PHENOL WITH ETHYLENE OXIDE

The general reaction for producing reaction products of alkylated phenol with ethylene oxide is described in U.S. Patent 2,213,477 granted September 3, 1940.

For the purpose of the present invention, the manner in which applicant has carried out the initial and decolorizing reactions will be described in a general way as performed in the manufacture of adducts of monononyl phenol and ethylene oxide, generally containing from 4 to 30 ethylene oxide molecules per molecule of phenol.

Such adducts, with molecular weights up to 1540, are prepared by the batch-wise reaction of ethylene oxide with monononyl phenol in the presence of alkaline reacting catalysts such as anhydrous sodium hydroxide, sodium acetate, or sodium methylate. Normal reaction conditions include temperatures in the range of 140° to 200° C., and pressures of 20–60 p.s.i.g. The average molecular weight of the product is governed by the weight ratio of ethylene oxide to monononyl phenol. The product in each case is a mixture of varying chain lengths.

After completion of the initial reaction the catalyst in the product is treated with an acidic substance, advantageously orthophosphoric acid. This is followed by a digestion period at 100° to 150° C. in the presence of air, for a period of time governed by the pH and color of the product. At the conclusion of the digestion period the product is filtered at 100° to 150° C. to remove precipitated phosphate salts.

Generally the reaction product is acidified to a substantially neutral condition, which may vary from a pH as high as 8 for a 10% solution in water to a pH as low as 4 for a 1% solution. It is also sometimes desirable to produce an acid product having a pH range (in 1% aqueous solution) of 4.0 to 6.0. These acid products normally are of very light color, such as less than 100 on the Pt-Co scale. The initial reaction product is generally neutralized with 1.5 to 2 parts of 85% orthophosphoric acid to 1 part of sodium hydroxide by weight for an acid product. For the neutral product, the orthophosphoric acid is added in an amount of 0.5 to 1.5 parts to 1 part by weight of sodium hydroxide.

*Example VII*

In the preparation of an adduct of monononyl phenol with ethylene oxide (1 mol nonylphenol-9 mols ethylene oxide), 890 pounds of monononyl phenol was charged to a reactor and flake sodium hydroxide catalyst in the amount of 404 grams was added thereto. The charge was heated to a temperature of 140° C., and ethylene oxide in the amount of 1630 pounds was reacted with the mononyl phenol over a period of 5.6 hours while holding the temperature at 140°–180° C. and the reactor pressure at about 40 p.s.i.g. The product was yellow, having a Pt-Co color of 273. It had an estimated ash content of 0.035 wt. percent.

After completion of the reaction 350 grams of 85% orthophosphoric acid was added to the product in the reactor while excluding air therefrom, giving a weight ratio of .87 part of acid to 1 part of sodium hydroxide. Air was then bubbled through the product for a period of one hour at a temperature of 120–140° C.

Then the product was filtered to remove precipitated phosphate salts, after which it was found to have a Pt-Co color of only 48, an ash content of 0.0024 wt. percent, and a pH (in 10% aqueous solution) of 6.8.

The product had an average composition corresponding to one mol of mononyl phenol combined with 9.5 mols of ethylene oxide.

A sample of the product after accelerated aging as in Example III had a Pt-Co color of 21.

Example VIII

The same reactions were carried out successfully under different conditions as outlined below with an adduct of 1 mol nonylphenol with 12 mols ethylene oxide.

Initial reaction:
| | |
|---|---|
| Mononyl phenol _____pounds__ | 750 |
| Ethylene oxide _____do____ | 1808 |
| Sodium hydroxide _____grams__ | 341 |
| Reaction temperature _____° C__ | 150–170 |
| Pressure _____p.s.i.g__ | 38 |
| Reaction time _____hours__ | 6.7 |
| Product color (Pt-Co) _____ | 325 |
| Estimated ash content wt. percent _____ | 0.029 |

Product treatment:
| | |
|---|---|
| Orthophosphoric acid (85%) _____grams__ | 511 |
| Digestion period _____hours__ | 1.2 |
| Color of filtered product (Pt-Co) _____ | 42 |
| Acid:NaOH weight ratio _____ | 1.5 |
| pH (1% aqueous solution) _____ | 6.4 |
| Ash content wt. percent _____ | 0.031 |
| Color after accelerated aging test _____ | 45 |

Example IX

Producing an adduct of 1 mol nonylphenol with 9.5 mols ethylene oxide.

| | A | B | C |
|---|---|---|---|
| Catalyst used | Na acetate | Na methylate | NaOH |
| Catalyst in product, wt. percent | .038 | .038 | .034 |
| Pt-Co color initial product | 160 | 168 | 265 |
| pH (1% aq. sol.) | 7.7 | 9.6 | 8.6 |
| Product treatment—30 minutes air blowing at 110–130° C.: | | | |
| Acid used | citric | H₃PO₄ (85%) | CO₂ |
| Wt. ratio, acid:catalyst | 2:1 | .5:1 | |
| Treated product: | | | |
| Color, Pt-Co | 77 | 86 | 130 |
| Ash, wt. percent | .001 | .027 | |
| pH (1% aq. sol.) | 5.2 | 6.9 | 6.1 |
| Product after stability test of Example III: | | | |
| Color, Pt-Co | 62 | 50 | 102 |
| pH (1% aq. sol.) | 5.3 | 6.7 | 6.8 |

Example X

An adduct having a composition approximately that of nonylphenol combined with 9.5 mols of ethylene oxide was prepared using sodium methylate as catalyst for the reaction. The product, which had a Pt-Co color of 273, was treated with acetic acid in the amount of two parts to one part of catalyst by weight. The product was then stirred and a slow stream of air passed through the mass for one hour during which time the temperature remained in the range 110–130° C. The product had a Pt-Co color of 107 after this treatment.

METHOXY POLYETHYLENE GLYCOL

In preparing this compound diethylene glycol monomethyl ether is reacted with ethylene oxide in the presence of 0.18 wt. percent of sodium hydroxide on the basis of charge of diethylene glycol monomethyl ether. The temperature and pressure are maintained in the ranges of 145–155° C. and 12 to 20 p.s.i.g., respectively. Ethylene oxide is added over a period of about 3 hours.

The initial reaction product is then neutralized with an acidic material such as citric acid, and is digested at a temperature of 100 to 120° C, after which the product is filtered to remove precipitated compounds.

Example XI

Methoxy polyethylene glycol of average molecular weight 350 was prepared by reacting 587 pounds of diethylene glycol monomethyl ether with 1092 pounds of ethylene oxide in the presence of 0.18 wt. percent sodium hydroxide, basis ether charge. Reaction temperature was maintained at 145–155° C. and pressure at 12–20 p.s.i.g. Reaction time was 3 hours.

Upon completion of the reaction the yellow product, having a Pt-Co color of approximately 100 and an estimated ash content of 0.063 wt. percent, was treated with 5.2 parts by weight of citric acid to 1 part sodium hydroxide charged, followed by digestion under air for 30 minutes at 100–120° C. The product was filtered and found to have been decolored to a Pt-Co number of 42, and to have an ash content of only 0.027 wt. percent.

ADDUCT OF LAURYL ALCOHOL WITH ETHYLENE OXIDE

Example XII

The adduct of lauryl alcohol (Du Pont "Lorol 9") and three mols of ethylene oxide was prepared by reacting 10.0 lbs. of ethylene oxide with 15.0 lbs. of lauryl alcohol containing 13.5 grams of sodium hydroxide catalyst. Reaction took place at 135 to 150° C. and 50 p.s.i.g. pressure. The reaction time was one hour. The product was colored Pt-Co 700 and had a pH in 5% aqueous solution of 8.8.

A portion of this product was then treated with 1.2 weight parts of the 85% orthophosphoric acid to each weight part of sodium hydroxide catalyst. Air was bubbled through the product for 30 minutes while maintaining the temperature at 110–130° C. After filtering the treated product its color was 325 Pt-Co and its pH in 5% aqueous solution was 4.7. Ash content of the filtered product was 0.018 wt. percent.

After storage under air at 100° C. for 65 hours a sample of the product had a Pt-Co color of 116.

A few general considerations for the procedures described above will be mentioned. In the first place, while the best results in decolorization are obtained when air is excluded from the initial reaction product until the acid treatment has actually begun, fairly successful results are also obtained even when air is admitted prior to the commencement of acid treatment. Furthermore, it is important that air be admitted into contact with the reaction mixture during the acid treatment. This may be accomplished in any suitable way, as by bubbling air through the liquid, or by maintaining an air pad above the surface of the liquid in the reactor, with or without mechanical stirring.

In the filtration procedure the liquid is generally filtered at a temperature of 100° to 150° C. since maximum removal of precipitated phosphates and other salts is thus achieved. At lower temperatures some precipitated phosphates may tend to go back into solution and thus be retained with the filtrate, thereby increasing ash content of the product.

The length of the digestion period with the acidic substance should be as short as possible commensurate with the desired color removal. For normal operation the digestion period may be from five minutes to one hour. However, if the initial reaction product is very dark in color, the digestion period may have to be as long as four to five hours.

With respect to digestion temperature, 100 to 150° C. is the range normally used. The lower limit was set because the solubility of the salt seems to increase with decreasing temperature. The upper limit was set because control of the rate of decolorization is more difficult at the higher temperatures. The range of 100 to 150° C. is not critical, however, because successful results in decolorizing the reaction product may be achieved at temperatures substantially above or below this range even though other advantages may thus be sacrificed.

Obviously, many modifications and variations of the invention, as hereinbefore set forth, may be made without departing from the spirit and scope thereof, and therefore only such limitations should be imposed as are indicated in the appended claims.

I claim:
1. In a process comprising reacting an alkylene oxide with a hydroxyl-containing organic compound selected from the group consisting of alcohols, phenols and partial ethers of polyhydroxy alcohols in the presence of an alkaline-reacting substance as a catalyst, to produce an ether reaction product: the improvement comprising decolorizing said reaction product by treating said reaction product with an acidic substance selected from the group consisting of phosphoric acid, acetic acid, sulfuric acid, citric acid and carbon dioxide in amount sufficient to react with at least part of said alkaline-reacting catalyst and produce a pH below about 8 while contacting said reaction product with an oxygen-containing gas.

2. In a process comprising reacting an alkylene oxide with a hydroxyl-containing organic compound selected from the group consisting of alcohols, phenols, and partial ethers of polyhydroxy alcohols in the presence of an alkaline-reacting substance as a catalyst, to produce an ether reaction product: the improvement comprising decolorizing said reaction product by treating said reaction product with at least one acidic substance selected from the group consisting of phosphoric acid, acetic acid, sulfuric acid, citric acid, and carbon dioxide in amount sufficient to react with at least part of said alkaline-reacting catalyst and produce a pH below about 8 while admitting air to said reaction product.

3. In a process in accordance with claim 2, excluding air from said reaction product until after treatment of said reaction product with said acidic compound has commenced.

4. In a process in accordance with claim 2, said alkylene oxide being ethylene oxide, said hydroxyl-containing organic compound being alkylated phenol, and said reaction product being an adduct of said ethylene oxide with said alkylated phenol.

5. A process in accordance with claim 2 wherein said acidic compound is phosphoric acid.

6. In the method for preparing a reaction product of ethylene oxide with a hydroxyl-containing organic compound selected from the group consisting of alcohols, phenols and partial ethers of polyhydroxy alcohols by polymerizing said ethylene oxide with said hydroxyl-containing compound in the presence of an alkaline reacting catalyst, the improvement which comprises decolorizing said reaction product by adding phosphoric acid to said product to react with said catalyst and produce a pH below about 8, digesting said resulting reaction product mixture at a temperature of 100–150° C. in the presence of air, and filtering the decolorized product from the resulting precipitate at said elevated temperature.

7. A process for refining crude polyethylene glycols containing colored bodies which comprises maintaining the crude polyethylene glycol having a molecular weight in the range of 200–1000 at a pH between 4 and 7 and at a temperature in the range of 100°–120° C. and passing a stream of air through the crude polyethylene glycol for a sufficient length of time to effect decoloration of the polyethylene glycol.

8. A process for refining crude polyethylene glycols containing colored bodies which comprises digesting crude polyethylene glycol having a molecular weight in the range 200–1000 in the presence of sufficient air at an effective elevated temperature while at a pH between 4 and 7 for sufficient time to effect decoloration of the polyethylene glycol.

9. In a process comprising reacting an ethylene oxide with ethylene glycol in the presence of an alkaline-reacting substance as a catalyst, to produce a polyethylene glycol: the improvement comprising decolorizing said polyethylene glycol by treating said polyethylene glycol with an acidic substance selected from the group consisting of phosphoric acid, acetic acid, sulfuric acid, citric acid and carbon dioxide in amount sufficient to react with at least part of said alkaline-reacting catalyst and produce a pH below about 8 while contacting said polyethylene glycol with an oxygen-containing gas.

10. In a process comprising reacting ethylene oxide with diethylene glycol in the presence of an alkaline-reacting substance as a catalyst to produce a polyethylene glycol: the improvement comprising decolorizing said polyethylene glycol by treating said polyethylene glycol with an acidic substance selected from the group consisting of phosphoric acid, acetic acid, sulfuric acid, citric acid and carbon dioxide in amount sufficient to react with at least part of said alkaline-reacting catalyst and produce a pH below about 8 while contacting said polyethylene glycol with an oxygen-containing gas.

11. In a process comprising reacting ethylene oxide with diethylene glycol monomethyl ether in the presence of an alkaline-reacting substance as a catalyst, to produce a methoxy polyethylene glycol: the improvement comprising decolorizing said methoxy polyethylene glycol by treating said methoxy polyethylene glycol with an acidic substance selected from the group consisting of phosphoric acid, acetic acid, sulfuric acid, citric acid and carbon dioxide in amount sufficient to react with at least part of said alkaline-reacting catalyst and produce a pH below about 8 while contacting said methoxy polyethylene glycol with an oxygen-containing gas.

12. In a process comprising reacting ethylene oxide with dipropylene glycol in the presence of an alkaline-reacting substance as a catalyst, to produce a polypropylene glycol: the improvement comprising decolorizing said polypropylene glycol by treating said polypropylene glycol with an acidic substance selected from the group consisting of phosphoric acid, acetic acid, sulfuric acid, citric acid and carbon dioxide in amount sufficient to react with at least part of said alkaline-reacting catalyst and produce a pH below about 8 while contacting said polypropylene glycol with an oxygen-containing gas.

13. In a process comprising reacting ethylene oxide with lauryl alcohol in the presence of an alkaline-reacting substance as a catalyst, to produce a lauryl alcohol-ethylene oxide adduct: the improvement comprising decolorizing said adduct by treating said adduct with an acidic substance selected from the group consisting of phosphoric acid, acetic acid, sulfuric acid, citric acid and carbon dioxide in amount sufficient to react with at least part of said alkaline-reacting catalyst and produce a pH below about 8 while contacting said lauryl alcohol-ethylene oxide adduct with an oxygen-containing gas.

References Cited in the file of this patent

UNITED STATES PATENTS

| | | |
|---|---|---|
| 2,723,294 | Benoit | Nov. 8, 1955 |
| 2,778,854 | Stoltz | Jan. 22, 1957 |